US008180962B2

(12) United States Patent
Tanaka et al.

(10) Patent No.: US 8,180,962 B2
(45) Date of Patent: May 15, 2012

(54) PERFORMANCE MANAGED COMPUTER, PROGRAM AND METHOD FOR A STORAGE SYSTEM

(75) Inventors: Toru Tanaka, Kawasaki (JP); Yuichi Taguchi, Sagamihara (JP); Noriko Nakajima, Machida (JP)

(73) Assignee: Hitachi, Ltd., Tokyo (JP)

( * ) Notice: Subject to any disclaimer, the term of this patent is extended or adjusted under 35 U.S.C. 154(b) by 486 days.

(21) Appl. No.: 12/439,731

(22) PCT Filed: Feb. 9, 2009

(86) PCT No.: PCT/JP2009/000504
§ 371 (c)(1),
(2), (4) Date: Mar. 3, 2009

(87) PCT Pub. No.: WO2010/089804
PCT Pub. Date: Aug. 12, 2010

(65) Prior Publication Data
US 2010/0205371 A1 Aug. 12, 2010

(51) Int. Cl.
*G06F 13/00* (2006.01)
(52) U.S. Cl. ........................................ 711/114; 711/156
(58) Field of Classification Search .................. 711/114, 711/156
See application file for complete search history.

(56) References Cited

U.S. PATENT DOCUMENTS 7,308,687 B2 * 12/2007 Trossman et al. ............. 718/104
2003/0093619 A1 * 5/2003 Sugino et al. ................. 711/114
2004/0024921 A1 * 2/2004 Peake et al. ....................... 710/1
2006/0171334 A1 8/2006 Hirata et al.
2008/0010370 A1 * 1/2008 Peake et al. ................... 709/223

FOREIGN PATENT DOCUMENTS

EP 1739558 1/2007
JP 2004-072135 3/2004

OTHER PUBLICATIONS

International Search Report for PCT/JP2009/000504; 3. pgs., dated May 25, 2009.

* cited by examiner

*Primary Examiner* — Reba I Elmore
(74) *Attorney, Agent, or Firm* — Antonelli, Terry, Stout & Kraus, LLP.

(57) ABSTRACT

Since the threshold excess is judged by a value of high-workload IO of backup that is designed on the assumption that the workload of storage is high, whether the performance limit has been reached remains uncertain. Furthermore, although an optimistic prediction trend with low workload trend and a pessimistic prediction trend with high pessimistic workload trend are presented, LUs that require improvement remain uncertain. Moreover, the time to improve the configuration and the effect of the improvement remain uncertain. To improve the configuration, configuration information, performance information, and operation information are acquired from storage, a performance limit excess time is predicted based on the performance information excluding LUs exceeding the performance trend, and an optimal improved configuration is determined from the performance limit after improvement and the time required for the improvement.

12 Claims, 14 Drawing Sheets

| COMPUTER (5001) | LU (5002) | TARGET IF (5003) | JOB (5004) |
|---|---|---|---|
| 1000 | 1421 | 1401 | BACKUP |
| 1000 | 1422 | 1401 | BACKUP |
| 1000 | 1431 | 1401 | ONLINE JOB |
| 1000 | 1432 | 1401 | ONLINE JOB |
| 1000 | 1432 | 1401 | ONLINE JOB |

| STORAGE (6001) | RG (6002) | CONTROLLER (6003) | HDD (6004) | HOST PATH (6005) |
|---|---|---|---|---|
| 1400 | 1420 | 260 | 300 | 400 |
| 1400 | 1430 | 280 | 280 | 410 |

| TREND (7001) | OPTIMISTIC TREND (7002) | PESSIMISTIC TREND (7003) |
|---|---|---|
| y=2t+10 | y=2t+10-100 | y=2t+10+100 |

| STORAGE (8001) | HDD (8002) | RG (8003) | RAID LEVEL (8004) | LU (8005) | SIZE (8006) | LIMIT (8007) | TIME (8008) |
|---|---|---|---|---|---|---|---|
| 1400 | 1414&1415 | 1440 | RAID1 | 1441 | 300GB | | |
| 1400 | 1414&1415 | 1450 | RAID5 | 1451 | 300GB | | |

| STORAGE (9001) | RG (9002) | RAID LEVEL (9003) | LU (9004) | SIZE (9005) |
|---|---|---|---|---|
| 1400 | 1420 | RAID1 | 1421 | 200GB |
| 1400 | 1420 | RAID1 | 1422 | 200GB |
| 1400 | 1430 | RAID5 | 1431 | 200GB |
| 1400 | 1430 | RAID5 | 1432 | 300GB |
| 1400 | 1430 | RAID5 | 1433 | 300GB |

| TIME (10001) | STORAGE (10002) | RG (10003) | LU (10004) | READ IOPS (10005) | WRITE IOPS (10006) | HIT (10007) |
|---|---|---|---|---|---|---|
| 2008/11/20-10:00 | 1400 | 1420 | 1421 | 100 | 200 | 80 |
| 2008/11/20-10:10 | 1400 | 1420 | 1421 | 200 | 300 | 70 |
| : | : | : | : | : | : | : |
| 2008/11/20-13:00 | 1400 | 1430 | 1431 | 10 | 50 | 10 |
| 2008/11/20-13:10 | 1400 | 1430 | 1431 | 10 | 50 | 10 |
| : | : | : | : | : | : | : |
| 2008/11/20-13:00 | 1400 | 1430 | 1433 | 10 | 50 | 10 |
| 2008/11/20-13:10 | 1400 | 1430 | 1433 | 10 | 50 | 10 |
| : | : | : | : | : | : | : |

17001

18001 18002 18003 18004 18005

| START TIME | PASSED TIME | STORAGE | LU | JOB |
|---|---|---|---|---|
| 2007/04/01-10:00 | 180min | 1400 | 1411 | Backup1 |
| 2008/04/01-10:00 | 180min | 1400 | 1412 | Backup2 |

PERFORMANCE MANAGED COMPUTER, PROGRAM AND METHOD FOR A STORAGE SYSTEM

TECHNICAL FIELD

The present invention relates to a storage system, and for example, to a technique for managing the performance of a storage system.

BACKGROUND ART

In recent years, the amount of data handled by a computer has increased as a result of the improvement in the performance of computer and the improvement in the speed of Internet connection. Since there is a limit to the performance of storage that processes data handled by a computer, proactive performance management for improving the configuration of storage before exceeding the performance limit is highly expected. Therefore, a technique for monitoring the workload of storage and issuing a warning when the threshold is exceeded is disclosed (see Patent Document 1). Additionally, software for calculating the future prediction from the workload trend of storage is disclosed (see Non-Patent Document 1).

Patent Citation 1: JP Patent Publication (Kokai) No. 2004-072135.

Non Patent Citation 1: JP1/HiCommand Tuning Manager, Reference Guide, pp. 114-130

DISCLOSURE OF INVENTION

Technical Problem

However, according to the technique of Patent Document 1, the limit is judged based on whether the instantaneous peak value of workload exceeds the threshold. Therefore, since the threshold excess is judged by the value of high-workload IO of backup or the like that is designed on the assumption that the workload of storage is high, whether the performance limit has been reached remains uncertain.

Furthermore, although the technique of Non-Patent Document 1 presents an optimistic prediction trend with low workload trend and a pessimistic prediction trend with high pessimistic workload trend, LUs that require improvement remain uncertain. Moreover, according to a combination of Patent Document 1 and Non-Patent Document 1, the time to improve the configuration (although determined by time for changing the configuration and the logical processing time in the computer, what is dominant is the processing time by the computer for moving the data in a configuration with improved (extended) required data (thus, the latter)) and the effect of the improvement remains uncertain. Therefore, an improved configuration cannot be determined.

The present invention has been made in view of the forgoing circumstances, and the present invention provides a technique that accurately predicts a performance trend of storage and a performance limit excess time without being affected by an instantaneous peak value of workload and that proposes an optimal improved configuration.

Technical Solution

To solve the problems, the present invention acquires configuration information, performance information, and operation information from a storage, predicts the performance limit excess time based on the performance information excluding LUs exceeding a performance trend, and determines an optimal improved configuration from the performance limit after improvement and the time required for the improvement.

More specifically, the present invention relates to a storage system (1) comprising a storage (1400) and a performance managing unit (1100) that manages processing performance of the storage. The performance managing unit obtains an approximate function (approximate straight line) of an amount of IO based on the transition of the amount of IO from a computer (1000) to the storage within a predetermined period to set the approximate function as a performance trend (7001) of the storage, further calculates a standard deviation of the amount of IO, and outputs the performance trend and comparison information between the standard deviation and the performance limit of the storage to an output unit (16004). The performance managing unit may be designed to calculate the performance trend and the standard deviation every time a computation instruction (pressing of an OK button (see FIG. 16)) is inputted by the administrator and to output information of comparison with the performance limit of the storage to the output unit.

The performance managing unit sets a minimum value among a total value of performance limits of disk devices (1410 to 1413) in each RAID group in the storage, a performance limit of a controller (1403) of the storage in each RAID group, and a performance limit of a bandwidth (host path 1401) from the computer to the storage in each RAID group as a performance limit of the storage. More specifically, the performance managing unit calculates an IO pattern for each RAID group, the IO pattern including an average of read/write rate and an average of read hit rate, and refers to a performance limit table storing the performance limits of the disk devices, the controller, and the host path corresponding to combinations of configurations of the IO patterns and the RAIDs to acquire the performance limits of the disk devices, the controller, and the host path from configurations of the calculated IO patterns and RAID groups to be processed.

The performance managing unit further reads out a prepared extension plan of the disk devices in the storage, calculates an extension time in the case where the configuration of the extension plan is implemented, the extension time including the time required for moving data to the extended disk devices, and outputs the comparison information as well as the extension plan and the extension time (16003) to the output unit.

The performance managing unit may be designed to further calculate a time zone (21003), in which a job is executed, from execution schedule information (17001) of the job in the computer or to calculate the performance trend from an amount of IO of another time zone to calculate the approximate function. In this case, the performance managing unit takes the sum of a plurality of job execution periods to specify the time zone in which the job is executed.

The performance managing unit may also be designed to narrow down the targets to RAID groups including storage areas having an amount of IO exceeding the value of the performance trend obtained first plus the standard error and to recalculate the performance trend of the targets.

Further features of the present invention will become apparent from the best mode for carrying out the present invention and the appended drawings.

Advantageous Effects

According to the present invention, a performance trend and a performance limit excess time of storage can be accurately predicted without being affected by a peak value, and an optimal improved configuration can be proposed. Therefore, proactive performance management can be realized.

BRIEF DESCRIPTION OF THE DRAWINGS

FIG. 5 is a diagram of the contents of a computer setting table in the computer.

FIG. 6 is a diagram of the contents of a performance limit information table in the managed computer.

FIG. 7 is a diagram of the contents of a performance trend information table in the managed computer.

FIG. 8 is a diagram of the contents of an improved configuration information table in the managed computer.

FIG. 9 is a diagram of the contents of a storage configuration information table in the storage.

FIG. 10 is a diagram of the contents of a storage performance information table in the storage.

EXPLANATION OF REFERENCE

Figure 1:
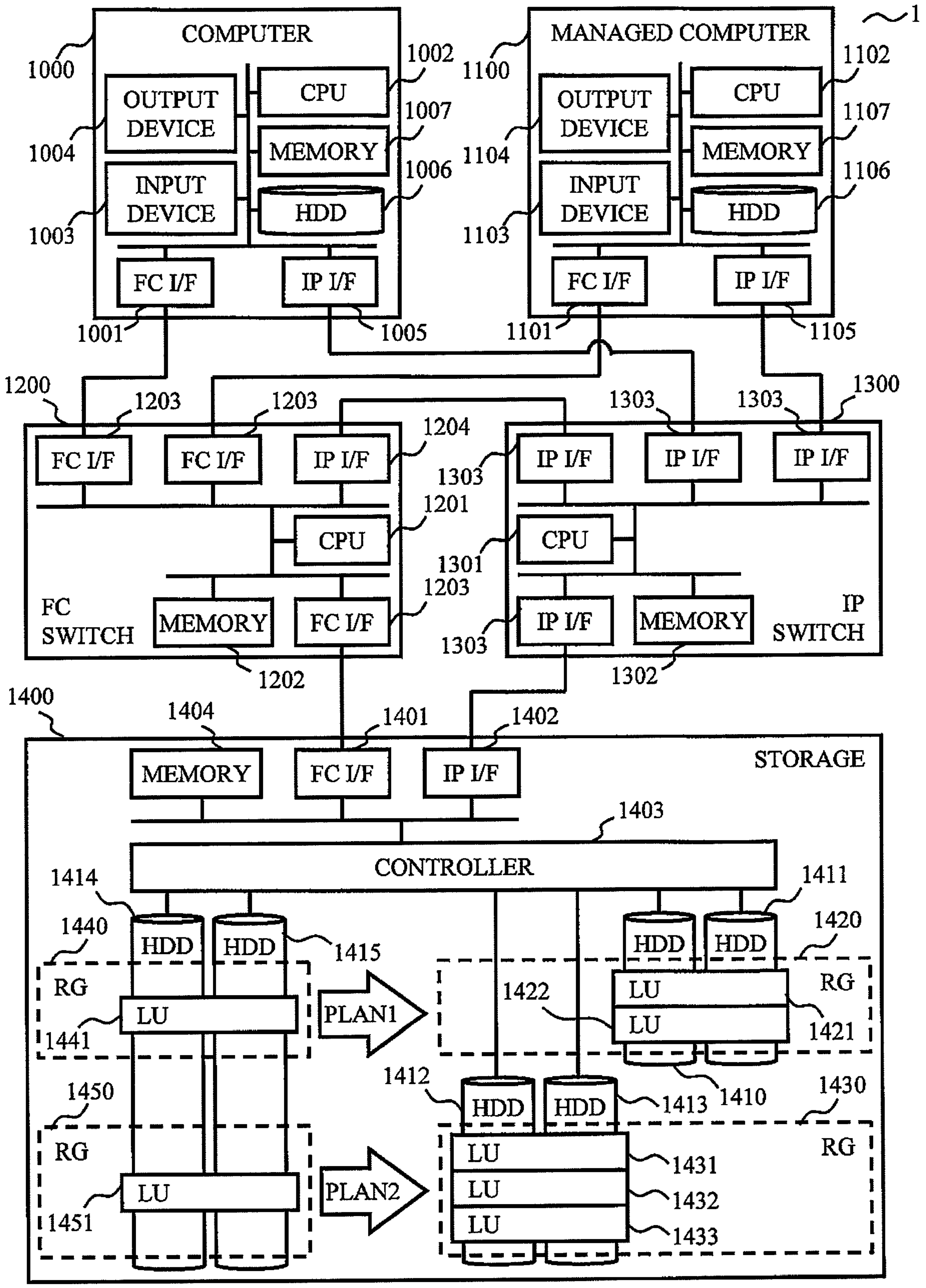
FIG. 1 is a diagram of a schematic configuration of a storage system according to embodiments of the present invention.

1000 . . . computer, 1100 . . . managed computer, 1200 . . . FC switch, 1300 . . . IP switch, 1400 . . . storage, 16000 . . . output screen

BEST MODE FOR CARRYING OUT THE INVENTION

The present invention predicts a realistic workload excess time (limit time) in a storage system from the past usage without being bothered by an instantaneous peak value of workload and provides an effective configuration improvement plan based on the prediction result.

The embodiments of the present invention will now be described with reference to the appended drawings. It should be noted that the present embodiments only illustrate an example for realizing the present invention and should not be construed as limitations of the technical scope of the present invention. Common configurations in the drawings are designated with the same reference numerals.

1) First Embodiment

<Configuration of Storage System>

FIG. 1 is a diagram of a configuration (common configuration in the embodiments) of a storage system 1 in the embodiments of the present invention. In the present invention, the storage system 1 is implemented to calculate the performance limit of a storage 1400 used by a computer 1000.

The storage system 1 includes at least one computer 1000, at least one managed computer 1100, at least one FC switch 1200, at least one IP switch 1300, and at least one storage 1400.

The computer 1000 is a computer for performing input and output to the storage 1400 and comprises: an FC_I/F 1001 that transmits and receives input/output data to and from the storage 1400; an IP_I/F 1005 that transmits and receives management data to and from the managed computer 1100; a CPU 1002 that executes programs to control the entire computer; a memory 1007 that is a storage area of the programs; a storage 1006 that stores the programs, user data, or the like; an input device 1003 such as a keyboard and a mouse for inputting information from the user; and an output device 1004 such as a display that displays information to the user.

The managed computer 1100 is a computer that manages the computer 1000 and the storage 1400 and comprises: an FC_I/F 1101 that transmits and receives input/output data and control data to and from the storage 1400; an IP_I/F 1105 that transmits and receives management data to and from the computer 1000 and the storage 1400; a CPU 1102 that executes programs to control the entire computer; a memory 1107 that is a storage area of the programs; a storage 1106 that stores the programs, user data, and the like; an input device 1103 such as a keyboard or a mouse for inputting information from the user; and an output device 1104 such as a display that displays information to the user.

The FC switch 1200 is a switch device for transferring the input/output data from the managed computer 1000 to the storage 1400 or the like and comprises: an FC_I/F 1203 that transmits and receives the input/output data; an IP_I/F 1204 that transmits and receives management data; a CPU 1201 that executes programs to control the entire FC switch; and a memory 1202 that is a storage area of the programs and data.

The IP switch 1300 is a switch device that transfers management data from the managed computer 1100 to the computer 1000 or the like and comprises: an IP_I/F 1303 that transmits and receives the management data; a CPU 1301 that executes programs to control the entire IP switch; and a memory 1302 that is a storage area of the programs and data.

The storage 1400 is a node that processes the input/output data from the computer 1000 and comprises: an FC_IF 1401 that receives the input/output data transferred from an FC switch; an IP_I/F 1402 that receives the management data from the managed computer 1100; a controller 1403 that executes programs to control the entire storage; a memory 1404 that is a storage area of the programs; and a disk device that saves user data. Disk devices 1410, 1411, 1412, and 1413, RAID groups 1420 and 1430 in which the disk devices are logically partitioned, LUs 1421, 1422, 1431, 1432, and 1433 in which the RAID groups are partitioned in a form visible by the user denote a storage configuration before extending the storage. Storages 1414 and 1415, RAID groups 1440 and 1450, and LUs 1441 and 1451 denote PLANs 1 and 2 for extension (extension plans). Thus, the PLANs 1 and 2 are not yet connected to the controller 1403.

<Internal Configuration of Memory>

Figure 2:
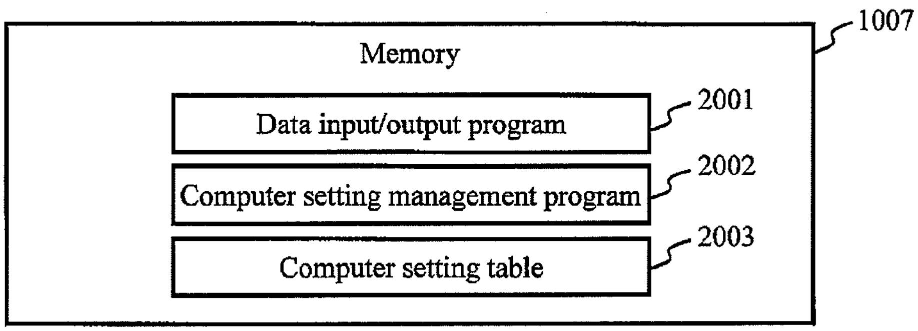
FIG. 2 is a diagram of an internal configuration of a memory of a computer.

FIG. 2 is a diagram of a memory configuration of the computer 1000. Upon startup, the computer 1000 reads out, from the HDD 1006, for example, a data input/output program 2001 for inputting and outputting data to the storage 1400, a computer setting management program 2002 for managing setting information of the computer, and a computer setting table 2003 that is setting information of the computer and stores them in the memory 1007.

Figure 3:
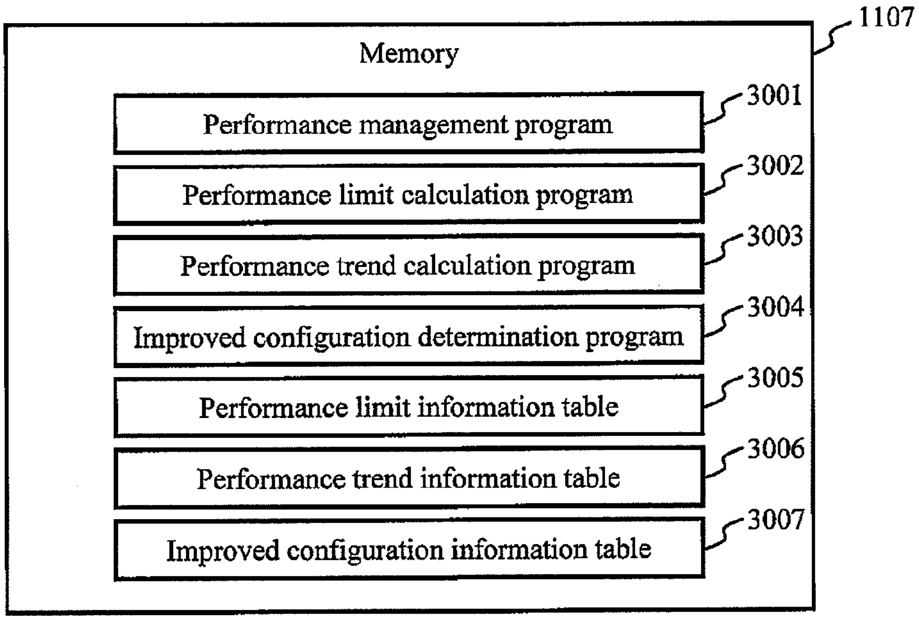
FIG. 3 is a diagram of an internal configuration of a memory of a managed computer.

FIG. 3 is a diagram of a memory configuration of the managed computer 1100. Upon startup, the managed computer 1100 reads out, from the HDD 1106 for example, a performance management program 3001 for managing the performance of the storage 1400, a performance limit calculation program 3002 that is a program for calculating the performance limit of the storage 1400, a performance trend calculation program 3003 that is a program for calculating the performance trend of the storage 1400; an improved configuration determination program 3004 that is a program for determining an improved configuration of the storage 1400, a performance limit information table 3005 that is performance limit information of the storage 1400, a performance trend information table 3006 that is performance trend information of the storage 1400, an improved configuration information table 3007 that is improved configuration information of the storage 1400 and stores them in the memory 1107.

Figure 4:
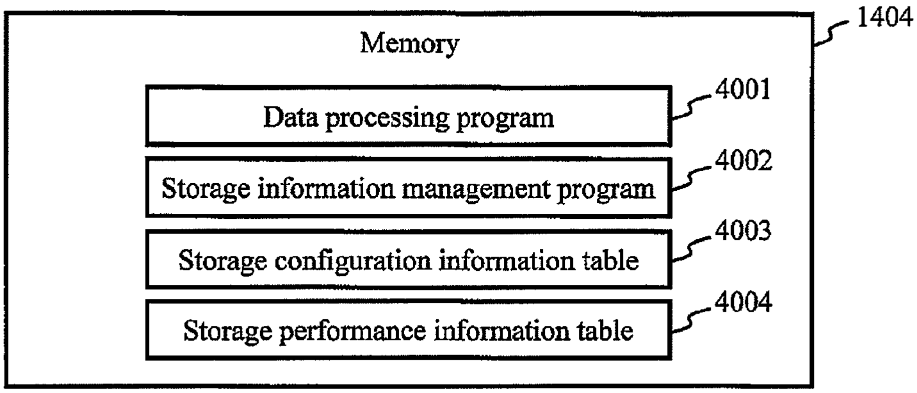
FIG. 4 is a diagram of an internal configuration of a memory of a storage.

FIG. 4 is a diagram of a memory configuration of the storage 1400. Upon startup, the storage 1400 reads out, from any HDD for example, a data processing program 4001 for causing the computer 1000 or the like to access the storage 1400, a storage information management program 4002 for managing configuration information and performance information of storage, a configuration information table 4003 that is configuration information of storage, and a storage performance information table 4004 that is performance information of storage and stores them in the memory 1404.

Although the tables and the programs are read out from the target disk devices (HDD) herein, the example is not limited to this. The tables and the programs may be read out from separate storage means (for example, service device).

<Contents of Read Out Tables>

FIG. 5 is a diagram of a configuration of the computer setting table 2003. The computer setting table 2003 comprises COMPUTER 5001 that is an identifier of computers, LU 5002 that is an identifier of LUs used by the computers, TARGET_IF 5003 denoting connection points of the LUs used by the computers, and JOB 5004 denoting job types of the LUs used by the computers. Although the applications of the LUs are predetermined as shown in JOB 5004, the applications may be able to be changed later.

FIG. 6 is a diagram of a configuration of the performance limit information table 3005. The performance limit information table 3005 comprises STORAGE 6001 that is an identifier of storages, RG 6002 that is an identifier of RAID groups, CONTROLLER 6003 denoting performance limit values of controllers, HDD 6004 denoting performance limit values of HDDs, and HOST_PATH 6005 denoting performance limit values of paths from the computers to the storages.

In FIG. 6, the values inputted to the CONTOROLLER 6003, the HDD 6004, and the HOST_PATH 6005 denote the numbers of IO that can be processed (IOPS). The values calculated by the performance limit calculation program 3002 in advance are inputted to the fields.

FIG. 7 is a diagram of a configuration of the performance trend information table 3006. The performance trend information table 3006 comprises TREND 7001 denoting a formula of the performance trend of storage, OPTIMISTIC_TREND 7002 denoting a formula of an optimistic performance trend in which the workload to the storage is predicted low, and PESSIMISTIC_TREND 7003 denoting a formula of a pessimistic performance trend in which the workload to storage is predicted high. These are obtained by using data of workload from now (NOW) to a past predetermined period to perform computations (Formulas 1 to 6) described below, every time the user presses an OK button (see FIG. 16). As the workload constantly changes depending on the usage of the storage system 1, the formulas denoting the performance trend inputted to FIG. 7 change every time the button is pressed. Although the formulas indicating the performance trend are obtained every time the OK button is pressed, the formulas may be sequentially obtained according to the passed time.

FIG. 8 is a diagram of a configuration of the improved configuration information table 3007 (thus, improvement plans). The improved configuration information table 3007 comprises STORAGE 8001 that is an identifier of storages, HDD 8002 that is an identifier of HDDs to be extended, RG 8003 that is an identifier of RAID groups to be extended, RAID_LEVEL 8004 denoting RAID configuration types of the RAID groups to be extended, LU 8005 that is an identifier of LUs to be extended, SIZE 8006 denoting the capacities of the LUs to be extended, LIMIT 8007 denoting performance limits after extension, and TIME 8008 denoting time required for the extension. Thus, the table illustrates, for example, a PLAN for adding HDDs, which are shown in 8002 and to which the RAID 8003, the RAID_LEVEL 8004, and the LU 8005 are set, to the storages shown in 8001. The LIMIT 8007 and the TIME 8008 are blank at the initial stage.

FIG. 9 is a diagram of a configuration of the storage configuration information table 4003. The storage configuration information table 4003 comprises STORAGE 9001 that is an identifier of storages, RG 9002 that is an identifier of RAID groups, RAID_LEVEL 9003 denoting RAID configuration types of the RAID groups, LU 9004 that is an identifier of LUs, and SIZE 9005 denoting capacities of the LUs. In the present description, information of each row will be called one record.

FIG. 10 is a diagram of a configuration of the storage performance information table 4004. The storage performance information table 4004 comprises TIME 10001 denoting acquisition date and time of performance information, STORAGE 10002 that is an identifier of storages, RG 10003 that is an identifier of RAID groups, LU 10004 that is an identifier of LUs, READ_IOPS 10005 denoting read amounts of IO per second received by the storages, WRITE_IOPS 10006 denoting written amounts of IO per second received by the storages, and HIT 10007 denoting cache hit ratios of the read IO. The cache hit ratio herein denotes the rate of the number of times the processes have completed (returned data to the host computer) after being hit by cache without accessing up to the HDD in the READ_IO (apparent workload) (apparent workload×cache hit ratio=substantial workload of HDD). Thus, the completion of process by cache means that the workload is not imposed on the HDD, and the performance limit of the HDD differs depending on the value. Therefore, setting the cache hit ratio as a parameter for acquiring the performance limit is effective.

In the present embodiment, there is no record in the performance limit information table 3005, the performance trend information table 3006, and the improved configuration information table 3007.

<Performance Management Process>

Figure 11:
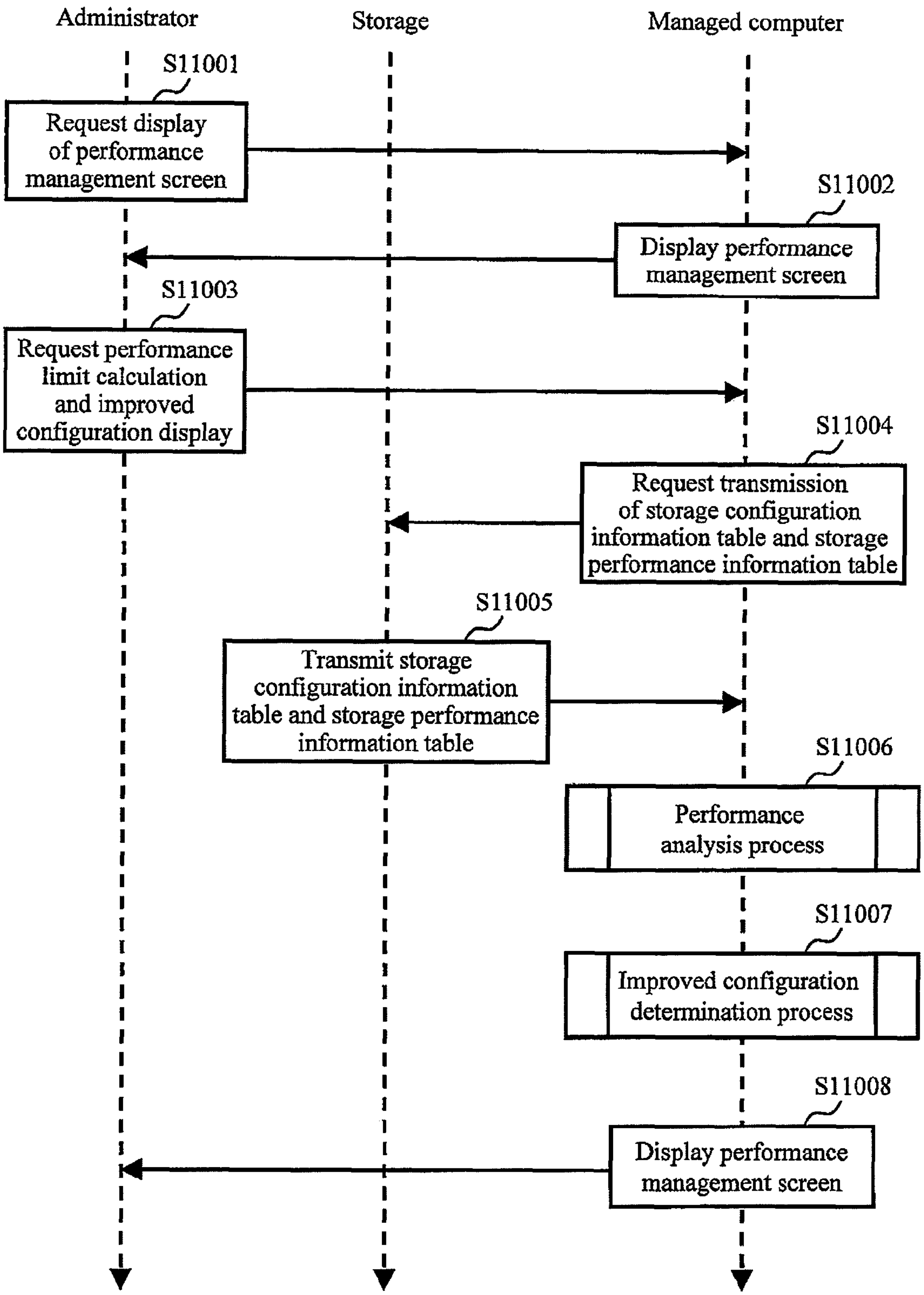
FIG. 11 is a flow chart for explaining a performance management process in an embodiment of the present invention.

FIG. 11 is a flow chart for explaining a performance management process of the present embodiment. The administrator uses, for example, the computer 1000 to transmit a display request of a performance management screen (see FIG. 16: PLAN, performance graph, and the like are not displayed at the initial stage) to the managed computer 1100 (step S11001). The performance management program (performance management processor) 3001 of the managed computer 1100 that has received the request transmits a performance management screen 2100 to the computer 1000 used by the administrator (step S11002). Although the computer used by the administrator is the computer 1000 herein, the computer may be the managed computer 1100 or may be other computers.

The computer 1000 used by the administrator then transmits a request of performance limit calculation and improved configuration display to the managed computer 1100 (step step S11003). The performance management program (performance management processor) 3001 of the managed computer 1100 that has received the request transmits a transmission request of the storage configuration information table 4003 and the storage performance information table 4004 to the storage 1400 (step S11004). The storage information management program 4002 of the storage 1400 that has received the request transmits the storage configuration information table 4003 and the storage performance information table 4004 to the managed computer 1100 (step S11005). The timing of transmission may be the timing of reception of the transmission request from the managed computer 1100 or may be the timing of a change in the storage configuration information table 4003 or the storage performance information table 4004.

The performance management program (performance management processor) 3001 of the managed computer 1100 then executes the performance analysis process (step S11006). The improved configuration determination program (improved configuration determination processor) 3004 executes an improved configuration determination process (step S11007) and transmits the performance management screen to the computer 1000 used by the administrator (step S11008). The CPU executes codes equivalent to the programs to realize the programs as the processors in parentheses.

<Performance Analysis Process>

Figure 12:
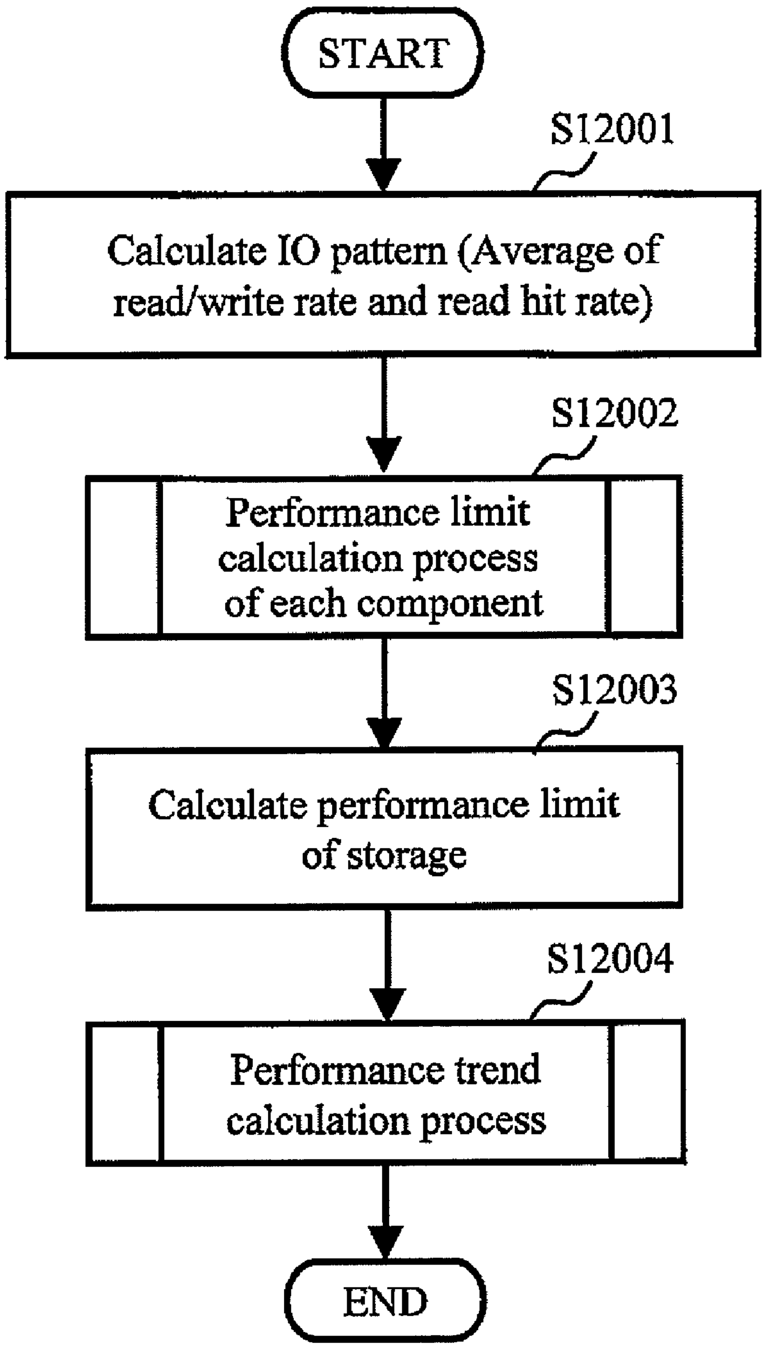
FIG. 12 is a flow chart for explaining details of a performance analysis process constituting part of the performance management process.

FIG. 12 is a flow chart for explaining details of the performance analysis process (step S11006).

The performance management program (performance management processor) 3001 first calculates the average of IO patterns (read rate: ratio of READ_IOPS in the total of READ_IOPS and WRITE_IOPS, read hit rate: HIT) of the storage performance information table 4004 (step 12001). The average herein denotes an average within a predetermined period (for example, a period from NOW to previous K months in FIG. 16) of each RG (RAID group), and the averages of all data (RGs) in FIG. 10 included within the predetermined period are calculated.

Figure 13:
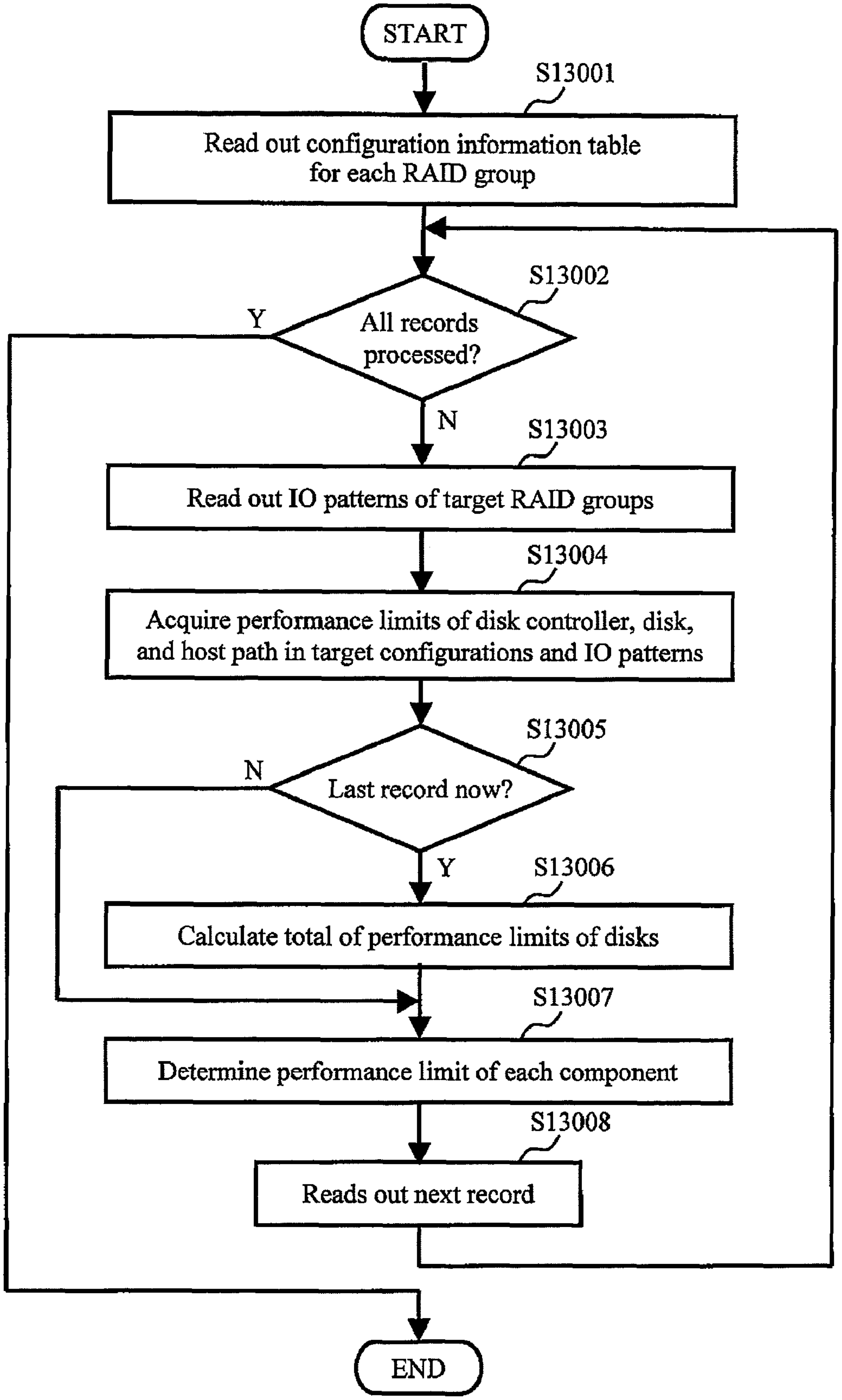
FIG. 13 is a flow chart for explaining details of a performance limit calculation process of each component in the performance analysis process (FIG. 12).

The performance limit calculation program (performance limit calculation processor) 3002 then executes a performance trend calculating process of components (step S12002). The details of the process are shown in FIG. 13. The “components” herein denote controllers, disks, and host paths (items listed in FIG. 6).

The performance limit calculation program (performance limit calculation processor) 3002 further calculates the performance limit of storage (step S12003). Specifically, the minimum value of the performance limits of the components obtained in step S12002 is set as the performance limit of the storage 1400. Thus, the minimum value of the CONTROLLER 6003, the HDD 6004, and the HOST_PATH 6005 in the performance limit information table 3005 is set. This process is based on the notion that the performance limit of the component that would reach the limit first determines the performance limit of the storage. In this case, although the performance limit of the storage 1400 is calculated and acquired when necessary, the configuration is not limited to this. A performance limit corresponding to the configuration may be calculated and stored in a memory in advance to be read out and acquired therefrom.

Figure 14:
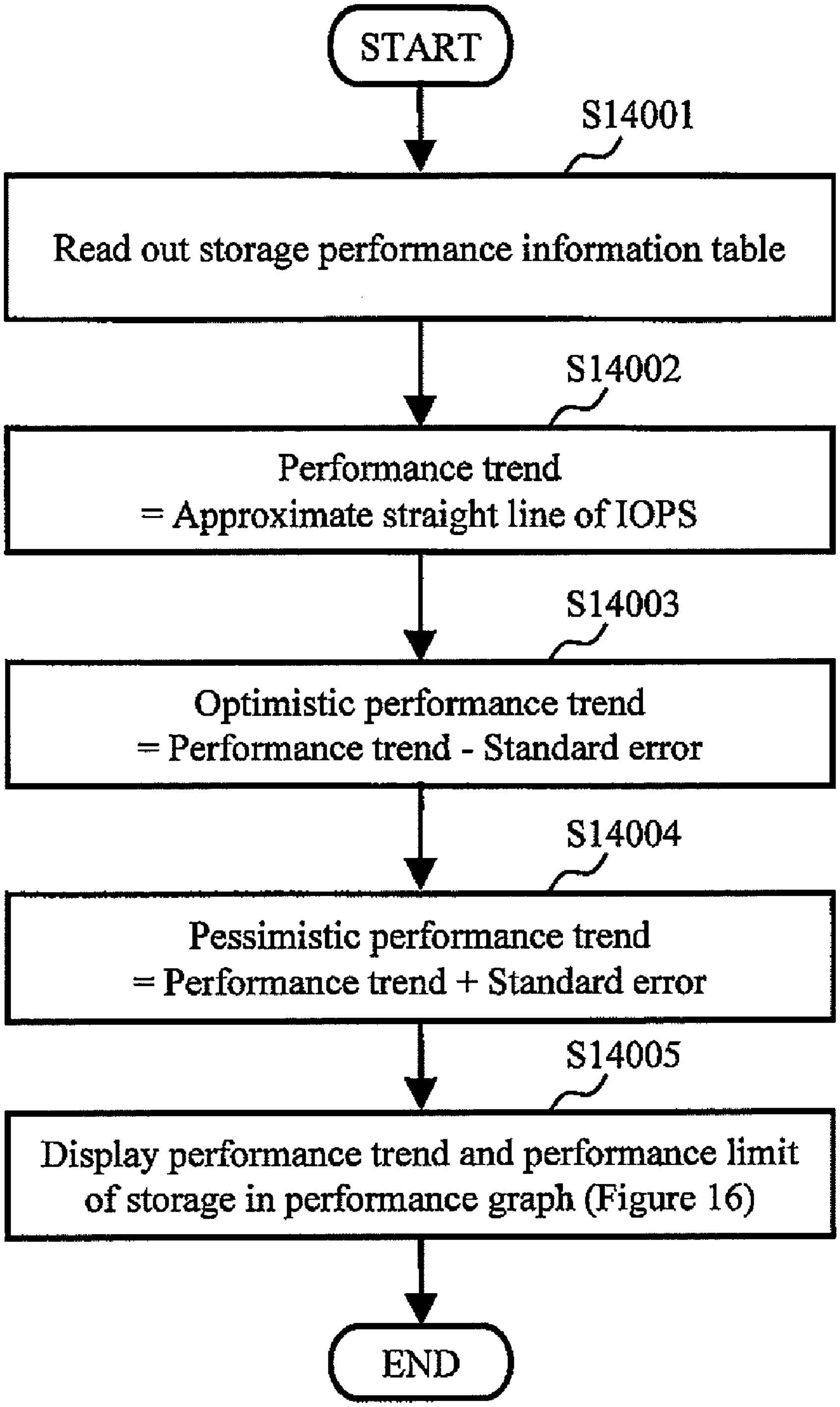
FIG. 14 is a flow chart for explaining details of a performance trend calculation process in the performance analysis process (FIG. 12).

Subsequently, the performance trend calculation program (performance trend calculation processor) 3003 executes a performance trend calculation process (step S12004). The details of the process are shown in FIG. 14.

<Performance Limit Calculation Process of Components>

FIG. 13 is a flow chart for explaining details of a performance limit calculation process of the components.

The performance limit calculation process program (performance limit calculation processor) 3002 reads out the storage configuration information table 4003 (see FIG. 9) for each RAID group and selects a leading record (information in the leading row) (step S13001).

Next, the performance limit calculation process program (performance limit calculation processor) 3002 determines whether all records are processed (step S13002), ends the process when the determination result is true, and reads out the IO patterns of the target RAID groups calculated in step S12001 described above when the determination result is false (step S13003).

Subsequently, based on the combination of the target configuration (current configuration) and the target IO pattern, the performance limit calculation process program (performance limit calculation processor) 3002 acquires information of the performance limits of the disk controller, the disk, and the host path and updates the CONTROLLER 6003, the HDD 6004, and the HOST_PATH 6005 in the performance limit information table 3005 (step S13004). The information of the limitations is stored in advance in a table not shown, corresponding to the combination of the target configuration and the target IO pattern.

The performance limit calculation process program (performance limit calculation processor) 3002 further determines whether all records are processed (step S13005) and calculates the total of the performance limits of the disks when the determination result is true (step S13006). The performance limits of the RGs are added (in step S13006) to obtain the performance limit of the entire storage 1400, and whether the performance limits of the components of the last RG are obtained is checked in step S13005 when there are a plurality of RGs in the storage 1400.

The performance limit calculation process program (performance limit calculation processor) 3002 also judges the performance limits (minimum values) of the components (controller and host path) (step S13007) and reads out the next record (step S13008).

<Performance Trend Calculation Process>

FIG. 14 is a flow chart for explaining details of the performance trend calculation process.

The performance trend calculation program (performance trend calculation processor) 3003 reads out the storage performance information table 4004 (step S14001), uses, for example, Formulas 1 to 3 to calculate the performance trend that is an approximate straight line calculated from the storage performance information table 4004 as a performance trend, and updates the TREND 7001 in the performance trend information table 3006 (step S14002).

The performance trend calculation program (performance trend calculation processor) 3003 then calculates an optimistic performance trend from the calculated approximate straight line and a standard error (Formula 4) calculated from the storage performance information table 4004 and updates the OPTIMISTIC_TREND 7002 in the performance trend information table 3006 (step S14003). The performance trend calculation program (performance trend calculation processor) 3003 further calculates a pessimistic performance trend from the calculated approximate straight line and the standard error calculated from the storage performance information table 4004 and updates the PESSIMISTIC_TREND 7003 in the performance trend information table 3006 (step S14004).

The performance trend calculation program (performance trend calculation processor) 3003 then displays the obtained performance trend (approximate straight line), optimistic performance trend, pessimistic performance trend, and the performance limit (threshold) of the storage 1400 obtained in step S12003 on a performance graph 16004 (FIG. 16) (step S14005). As a result, the administrator can recognize the period when the storage 1400 reaches the limit (limit reaching predicted time).

The formula used in the performance trend calculation process is as follows. In this case, the performance trend is, for example, a linear function, TOPS is y, and date and time is t.

[Math.1]

$$y=a\times t+b \quad \text{(Formula 1)}$$

To obtain the linear function using n pieces of data, a and b can be expressed as follows.

[Math.2]

$$a=(n\times\Sigma(y\times t)-(\Sigma y\times\Sigma t))/(n\times\Sigma(t\hat{}2)-(\Sigma t)\hat{}2) \quad \text{(Formula 2)}$$

[Math.3]

$$b=(\Sigma y-a\times\Sigma t)/n \quad \text{(Formula 3)}$$

Although the linear function expressing the performance trend is calculated using the least squares method in the present embodiment, the method for calculating the approximate straight line is not limited to the least squares method.

The standard error se can be expressed by the following formula.

[Math.4]

$$se=\surd(\Sigma(1-y)\hat{}2\div(N-2)) \quad \text{(Formula 4)}$$

The optimistic performance trend can be expressed by the following formula.

[Math.5]

$$y=a\times t+b+se \quad \text{(Formula 5)}$$

The pessimistic performance trend can be expressed by the following formula.

[Math.6]

$$y=a\times t+b+se \quad \text{(Formula 6)}$$

In the present embodiment, "standard error×1" is added/subtracted from the performance trend to calculate the optimistic performance trend/pessimistic performance trend in order to include about 65% of all IOPS between the optimistic performance trend and the pessimistic performance trend. However, "standard error×2" may be added/subtracted from the performance trend to calculate the optimistic performance trend and the pessimistic performance trend to include about 95% of all IPOS. Furthermore, although the standard error is calculated by the above formulas in the present embodiment because the linear function expressing the performance trend is calculated using the least squares method, the calculation formulas of the standard error are not limited by these.

<Improved Configuration Determination Process>

Figure 15:
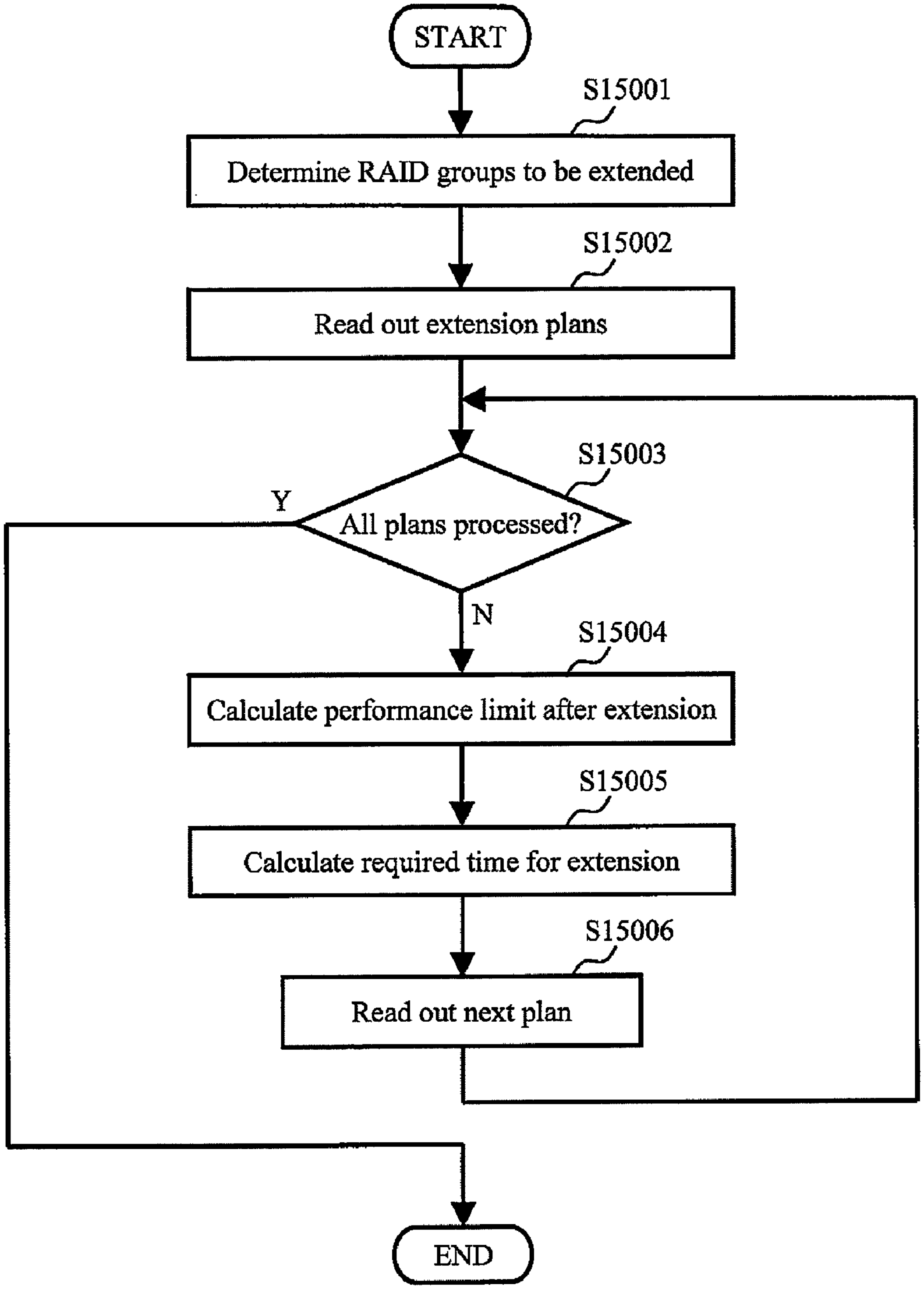
FIG. 15 is a flow chart for explaining details of an improved configuration determination process constituting part of the performance management process.

FIG. 15 is a flow chart for explaining details of the improved configuration determination process.

The improved configuration determination program (improved configuration determination processor) 3004 determines RAID groups to be extended (step S15001), reads out the extension plan, and selects the leading record (step S15002). In the first embodiment, all RAID groups are RAID groups to be extended. Since the target RAID groups are narrowed down in the following second embodiment, the narrowing-down process is equivalent to the process of determining the RAID groups to be extended. The extension plan is prepared in advance, and for example, an extension plan stored in the HDD 1106 of the managed computer 1100 is read out and stored in the memory 1107.

Next, the improved configuration determination program (improved configuration determination processor) 3004 determines whether all records (extension plans) are processed (step S15003), ends the process when the determination result is true, and shifts the process to step S15004 when the determination result is false.

The improved configuration determination program (improved configuration determination processor) 3004 then calculates the performance limits of the extended storages and updates the LIMIT 8007 in the improved configuration information table 3007 (step S15004). Thus, a process similar to steps S12002 and S12003 is executed in step S15004, and the performance limits of the storages are acquired from, for example, the above described tables based on the combinations of the extended configurations and the IO patterns before extension (calculated in S12001).

Subsequently, the improved configuration determination program (improved configuration determination processor) 3004 calculates the time required for the extension, updates the TIME 8008 in the improved configuration information table 3007 (step S15005), reads out the next record (extension plan) (step S15006), and similarly calculates the time required for extension in the next plan. In this way, the time required for the extensions in all extension plans is obtained.

The time required for extension is constituted by the total time of the time for creating the RAID groups in the storages, the time for creating the LUs in the storages, and the time for moving (copying) the data from existing LUs to extended LUs. The time for creating the RAID groups and the LUs is determined by their capacities. Supposing that the amount of data movement is determined by the ratio between the storage capacity before extension and the extended storage capacity, the time for data movement can be obtained by dividing the amount of data movement by the movement speed (transfer speed). However, since the time required for the data movement is longer than (dominant) the creation time of the RAID groups or LUs, that time can be set as the time required for extension.

The RAID groups to be extended are LUs in which IOPS in the storage performance information table 4004 are not exceeding the pessimistic performance trend. However, the administrator can also select the RAID groups to be extended.

<Configuration of Performance Management Screen>

Figure 16:
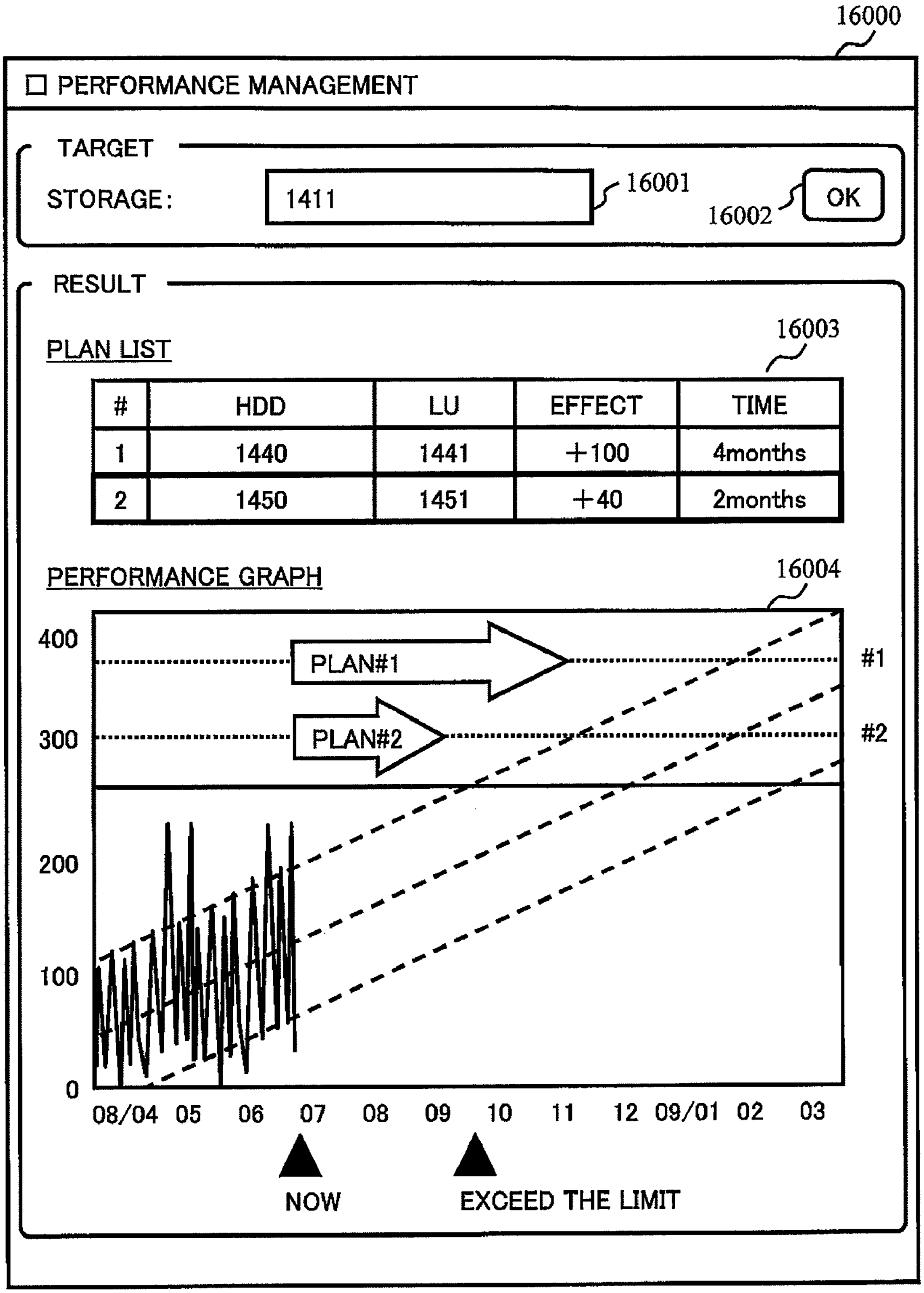
FIG. 16 is a diagram of a performance management screen example in an embodiment of the present invention.

FIG. 16 is a diagram of a configuration of a performance management screen 16000. The performance management screen 16000 is constituted by, for example: a text box 16001 for inputting target storages of performance management; a button 16002 for ordering the execution of the performance management process; an extension plan list 16003 for displaying extension plans denoting the result of the performance management process after the update button is pressed; and a performance graph 16004 showing the current performance trend and the performance limit, the performance limit after improvement, and the time required for the improvement.

As a result, the performance trend of storage and the performance limit excess time can be accurately predicted without being affected by the peak value, and an optimal improved configuration can be proposed. Therefore, proactive performance management can be realized. Thus, in the example shown in FIG. 16, considering the extension plan using a pessimistic prediction result, it can be determined that it is preferable to select the PLAN #2 that can complete the extension before exceeding the threshold of the performance limit.

2) Second Embodiment

In the second embodiment, the performance management program 3001 of the managed computer 1100 executes a process of narrowing down the records of the storage performance information table 4004 used in the performance analysis process. As the configuration of the storage system is the same as in the first embodiment, the description will be omitted. The points in the present embodiment different from the first embodiment will be mainly described.

<Internal Configuration of Memory>

Figures 17, 18:
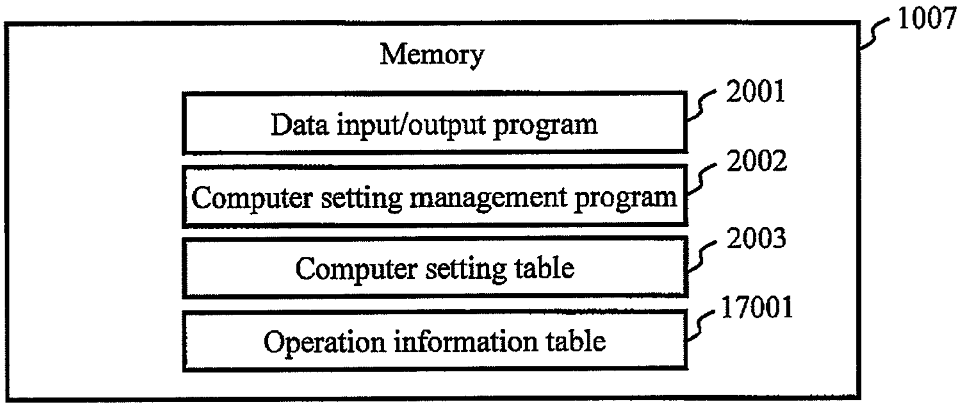
FIG. 17 is a diagram of an internal configuration of a memory of the computer in a second embodiment of the present invention.
FIG. 18 is a diagram of the contents of an operation information table in the computer.

FIG. 17 is a diagram of a memory configuration of the computer 1000. Upon startup, the computer 1000 reads out, from the HDD 1006 for example, a data input/output program 2001 for inputting and outputting data to the storage 1400, a computer setting management program 2002 for managing setting information of the computer, a computer setting table 2003 that is setting information of the computer, and an operation information table 17001 that is an execution schedule setting for operating jobs on the computer and stores them in the memory 1007.

The configurations of the memories of the managed computer 1100 and the storage 1400 are the same as in the first embodiment (FIGS. 2 and 3), and the description will be omitted.

<Contents of Read Out Tables>

The programs and the tables other than the operation table are the same as in the first embodiment, and the description will be omitted. The operation table 17001 is information used for narrowing down the RAID groups to be processed.

FIG. 18 is a diagram of a configuration of the operation information table 17001. The operation information table 17001 comprises START_TIME 18001 denoting start date and time of jobs, PASSED_TIME 18002 denoting maximum execution time of the jobs, STORAGE 18003 that is an identifier of storages for the jobs, LU 18004 that is an identifier of LUs for the jobs, and JOB 18005 denoting job names to be executed.

<Performance Management Process>

Figure 19:
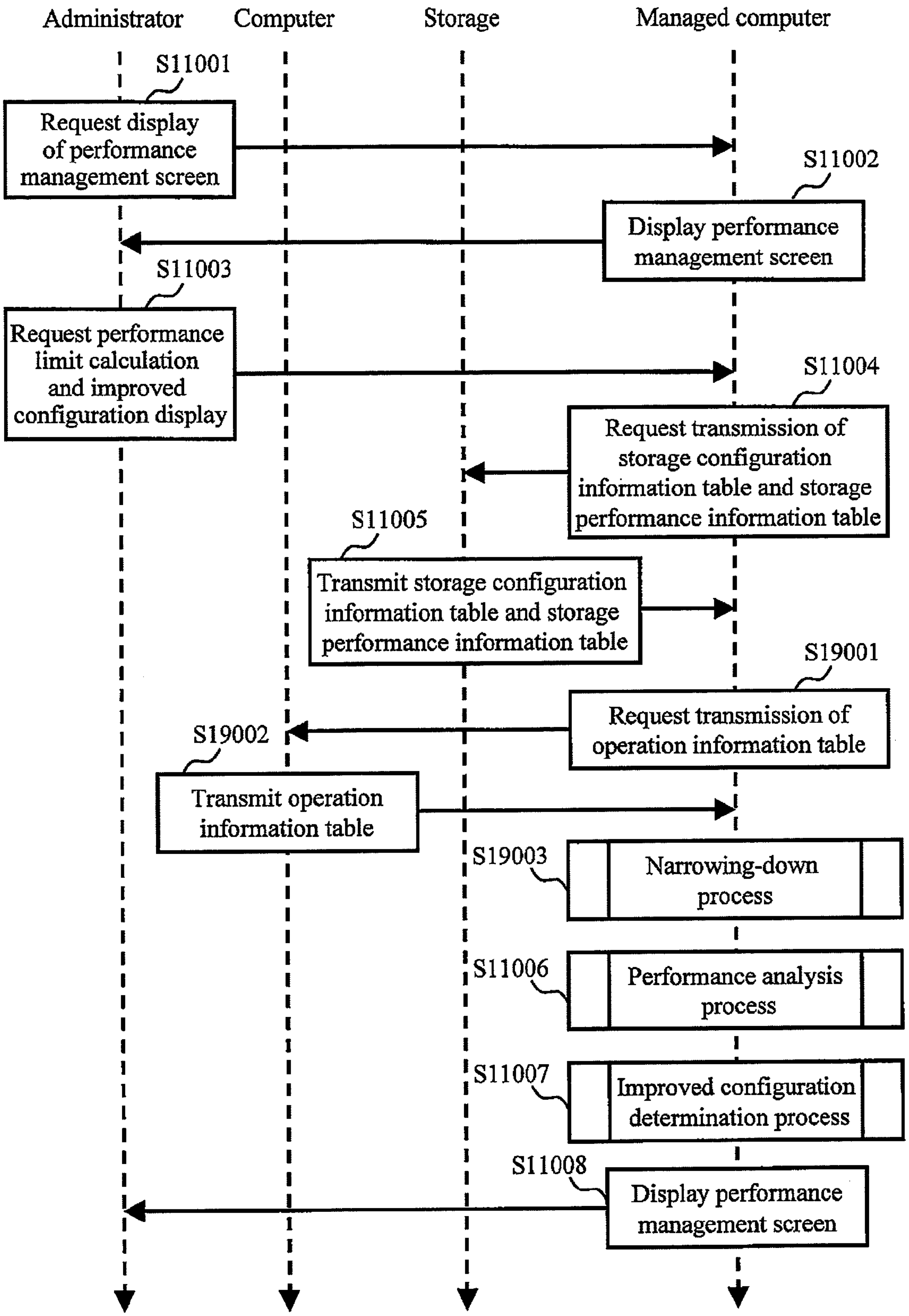
FIG. 19 is a flow chart for explaining a performance management process in the second embodiment of the present invention.

FIG. 19 is a flow chart for explaining details of a performance management process in the second embodiment.

The administrator transmits a display request of the performance management screen (see FIG. 16: PLAN, performance graph, and the like are not displayed at the initial stage) to the managed computer 1100 (step S11001). The performance management program (performance management processor) 3001 of the managed computer 1100 that has received the request transmits the performance management screen 2100 to the computer used by the administrator (step S11002). The computer used by the administrator can be any computer, such as the managed computer 1100 or the computer 1000, or may be completely different computers.

The computer used by the administrator then transmits a request of performance limit calculation and improved configuration display to the managed computer 1100 (step S11003). The performance management program (performance management processor) 3001 of the managed computer 1100 that has received the request transmits a transmission request of the storage configuration information table 4003 and the storage performance information table 4004 to the storage 1400 (step S11004).

The storage information management program (storage information management processor) 4002 of the storage 1400 that has received the transmission request transmits the storage configuration information table 4003 and the storage performance information table 4004 to the managed computer 1100 (step S11005). The timing of the transmission may be the timing of reception of the transmission request from the managed computer 1100 or may be the timing of a change in the storage configuration information table 4003 or the storage performance information table 4004.

The performance management program (performance management processor) 3001 of the managed computer 1100 also transmits a transmission request of the operation information table 17001 to the computer 1000 (step S19001). The computer setting management program (computer setting management processor) 2002 of the computer 1000 that has received the request transmits the operation information table 17001 to the managed computer 1100 (step S19002).

The performance management program (performance management processor) 3001 of the managed computer 1100 then executes a narrowing-down process of the storage performance information table 4004 (step S19003). Subsequently, the managed computer 1100 executes the performance analysis process (step S11006) and the improved configuration determination process (step S11007) and transmits the performance management screen to the computer used by the administrator (step S11008). The details of the performance analysis process and the improved configuration determination process are the same as in the first embodiment.

<Narrowing-Down Process (Determination Process of Extension Targets>

Figure 20:
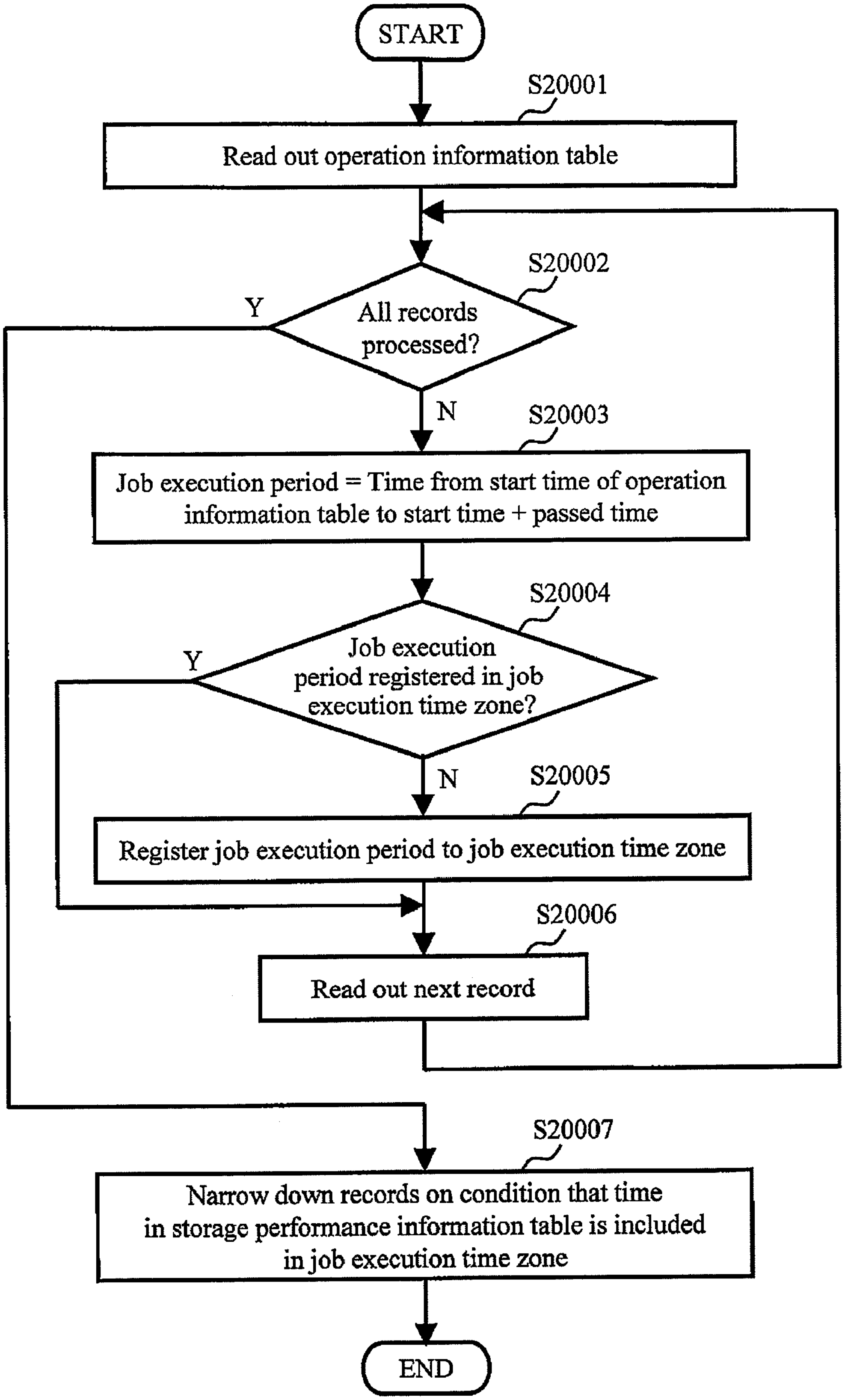
FIG. 20 is a flow chart for explaining details of a narrowing-down process in the performance management process (FIG. 19).

FIG. 20 is a flow chart for explaining details of the narrowing-down process. The performance management program (performance management processor) 3001 of the managed computer 1100 reads out the operation information table 17001 and selects the leading record (step S20001). The performance management program (performance management processor) 3001 determines whether all records (all information in the operation table) are processed (step S20002)

When the determination result is false, the performance management program (performance management processor) 3001 calculates the time from START_TIME 18001 to START_TIME 18001+PASSED_TIME 18002 in the operation information table 17001 as a job execution period (step S20003).

Next, the performance management program (performance management processor) 3001 determines whether the job execution period obtained in step S20003 is registered in a job execution time zone, i.e. in a table in the memory 1107 of the managed computer 1100 (concept: see FIG. 21) (step S20004), and then reads out the next record when the determination result is true (step S20006) and registers the job execution period to the job execution time zone when the determination result is false (step S20005). A period with overlapping jobs is checked by the process of step S2005.

When the determination result of step S20002 is true, the performance management program (performance management processor) 3001 narrows down the records on the condition that the TIME in the storage performance information table 4004 is included in the job execution time zone (step S20007) and ends the process.

Figure 21:
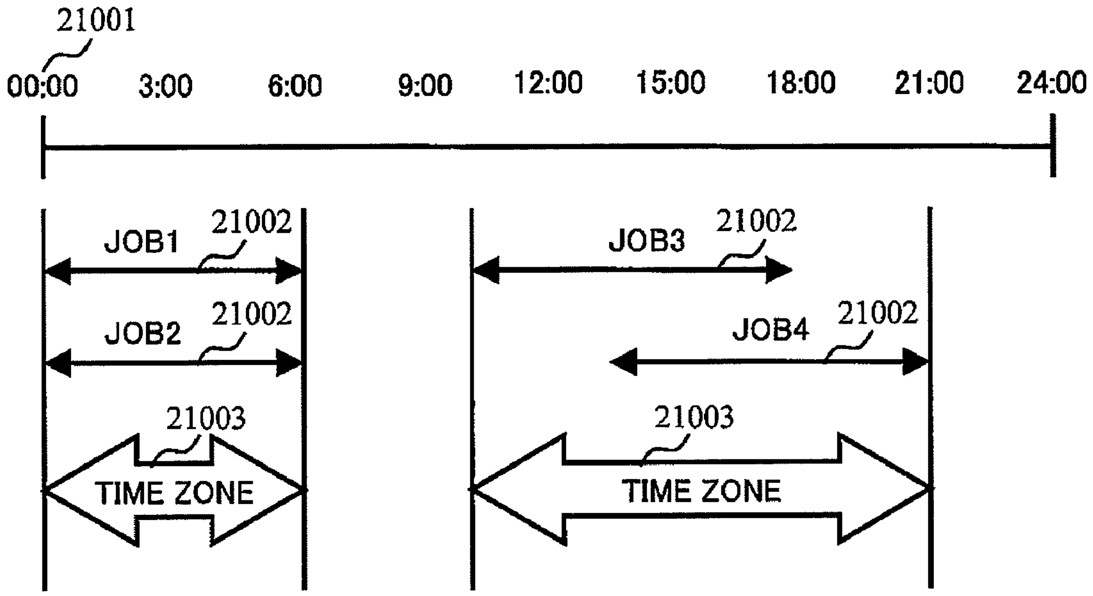
FIG. 21 is a diagram of a registration table for explaining the concept of a job execution period and a job execution time zone.

FIG. 21 is a conceptual diagram of a table for showing definition of the job execution period and the job execution time zone shown in the narrowing-down process and for determining the job execution time zone. Reference numeral 21001 denotes periods of job execution. The time zones are one-day cycle and the time zones are specified only by the time because execution time zones of jobs started up at a specific time are illustrated in the present embodiment. However, the cycle may be one week or the cycle may be a one-month cycle. Furthermore, the time zones may be specified by the date and time without determining the cycle.

Job execution periods 21002 denote the times of execution of the jobs, and job execution time zones 21003 denote assemblies of execution periods 21002.

The administrator may be able to specify with which of the job execution time zones or time zones other than the job execution time zones the performance analysis will be performed. The administrator can also narrow down the records of the operation information table 17001 used for calculating the job execution time zones by the day or job name that can be calculated from the START_TIME 18001. The performance management program (performance management processor) 3001 uses the records, in which the TIME 10001 of the storage performance information table 4004 is included in the job execution time zones, in the performance analysis process and the improved configuration determination process.

<Other Examples of Narrowing-Down Process>

Another narrowing-down method includes a method of narrowing down with used LUs determined from the computer setting table 2003. The used LUs denote an identifier of LUs used by the computer and denote a logical addition of LUs in which the JOB 5004 is not blank (=a certain job is using the LU) in the records of the computer setting table 2003.

The administrator may be able to specify whether to perform the performance analysis with the used LUs or with LUs other than the used LUs. The administrator can also narrow down the records of the operation information table 17001 used for determining the used LUs by the job names. The performance management program 3001 uses the records, in which the LUs in the storage performance information table 4004 are included in the used LUs, in the performance analysis process and the improved configuration determination process.

Another narrowing-down method of the storage performance information table 4004 includes a method of narrowing down with pessimistic performance trend excess LUs calculated from the storage performance information table 4004. The pessimistic performance trend excess LUs denote an identifier of LUs exceeding the pessimistic performance trend and denote a logical addition of LUs in which the total value of the READ_IOPS 10005 and the WRITE_IOPS 10006 of the same record is larger when a value calculated by the formula of the PESSIMISTIC_TREND 7003 in the performance trend information table 3006, with the TIME 10001 in the records in the storage performance information table 4004 being t, and a total value of the READ_IOPS 10005 and the WRITE_IOPS 10006 of the same record are compared.

The administrator may be able to specify whether to perform the performance analysis with the LUs exceeding the pessimistic performance trend or with LUs other than the LUs exceeding the pessimistic performance trend. The performance analysis process needs to be performed before the narrowing-down method is performed.

The performance limit after extension varies depending on the number of extended HDDs in the extended configuration. Therefore, it is effective to change the number of extended HDDs depending on the job type of the computer. As in the narrowing-down process described above, the performance trend of each job type can be calculated by executing the performance analysis process for each JOB 5004 in the computer setting table 2003. In this case, when the slopes of the linear functions of the performance trends of the jobs are different, the number of extended HDDs can be changed by the rate of the slopes.

3) Conclusion

In the present invention, the trend of workload (performance trend) is approximated with a function (for example, approximation with a linear function) based on time-series data of the amount of IO within a past determined period going back from now, and the standard deviation in the predetermined period is further obtained from the amount of IO. The function obtained by approximate function +/−standard deviation and the performance limit of the storage 1400 are then compared, and the time of reaching the limit is predicted and informed to the administrator. In this way, the accurate time of limit can be predicted without being affected by the instantaneous peak value of the workload, because the approximate function and the standard deviation are used and the prediction is based on the performance trend obtained first.

The prediction of the limit excess based on the performance trend and the standard deviation is performed every time the administrator requests. Therefore, the trend of workload in each case can be reflected on the prediction, and the administrator can recognize an appropriate limit excess time.

Furthermore, not only the total value of the performance limits of the disk devices of each RAID group in the storage 1400, but also the performance limit of the controller 1403 of each RAID group and the performance limit of the host path 1401 from the computer 1000 to the storage 1400 of each RAID group are taken into consideration, and the minimum value among them is set as the performance limit of the storage 1400. As a result, the limit excess time is predicted based not only on the capacity of HDD but also on the performances of all components related to reading and writing so that the limit excess time can be accurately predicted.

Furthermore, the extension time in the case where the configuration of a prepared extension plan of HDD is implemented is calculated in the present invention, the extension time including the time required for moving the data to the extended disk devices. The extension plan and the extension time are displayed on the display screen along with the comparison information. As a result, an optimal improved configuration can be presented based on a further accurate limit excess time, and proactive performance management can be realized.

Furthermore, the performance trend is calculated from the amount of IO in the time zone in which the job is executed or in another time zone, or the targets are narrowed down to the RAID groups including storage areas with the amount of IO exceeding the value of the performance trend plus the standard error to calculate the performance trends of the targets. In this way, the records are narrowed down before the performance analysis. As a result, the speed of the prediction computation can be increased, and the prediction accuracy of the trend analysis and the performance limit excess time can be improved. The operation cost can also be reduced.

The present invention can also be realized by a program code of software realizing the functions of the embodiments. In that case, a storage medium recording the program code is provided to a system or a device, and the system or the device of a computer (or CPU or MPU) reads out the program code stored in the storage medium. In that case, the program code read out from the storage medium realizes the functions of the embodiments, and the program code and the storage medium storing the program code constitute the present invention. Examples of the storage medium for supplying the program code include a flexible disk, a CD-ROM, a DVD-ROM, a hard disk, an optical disk, a magneto-optical disk, a CD-R, a magnetic tape, a nonvolatile memory card, and a ROM.

An OS (operating system) or the like operated on the computer may execute part or all of the actual processes based on an instruction of the program code, and the processes may realize the functions of the embodiments. Furthermore, after the program code read out from the storage medium is written in the memory of the computer, the CPU or the like of the computer may execute part or all of the actual processes based on an instruction of the program code, and the processes may realize the functions of the embodiments.

The program code of the software realizing the functions of the embodiments may be distributed through a network to store the program code in storage means such as a hard disk and a memory of a system or a device or in a storage medium such as a CD-RW and a CD-R, and the computer (or CPU or MPU) of the system or the device may read out and execute the program code stored in the storage means or the storage medium before use.

The invention claimed is:

1. A storage system comprising:

a storage; and a performance managing unit configured to manage processing performance of the storage, wherein:

the performance managing unit obtains an approximate function of an amount of IO based on the transition of the amount of IO from a computer to the storage within a predetermined period to set the approximate function as a performance trend of the storage, further calculates a standard error of the amount of IO, calculates an optimistic performance trend and a pessimistic performance trend from the approximate function as the performance trend and the standard error, further obtains a performance limit of the storage, and outputs comparison information between each of the performance trend and the performance limit to an output unit.

2. The storage system according to claim 1, wherein the performance managing unit is a managed computer, the storage, the managed computer, and the computer are connected through a network, the approximate function is an approximate straight line obtained from the transition of the amount of IO from an input of instruction to a past predetermined period, the managed computer further comprising:

a performance limit calculation processor that sets a minimum value among a total value of performance limits of disk devices in each RAID group in the storage, a performance limit of a controller of the storage in each RAID group, and a performance limit of a bandwidth from the computer to the storage in each RAID group as a performance limit of the storage; and an improved configuration determination processor that reads out a prepared extension plan of the disk device in the storage, calculates an extension time in a case where the configuration of the extension plan is implemented, the extension time including a time required for moving the data of the extended disk devices, and outputs the comparison information as well as the extension plan and the extension time to the output unit.

3. The storage system according to claim 1, wherein the performance managing unit calculates the performance trend and the standard error every time a computation instruction is inputted and outputs information of comparison with the performance limit of the storage to the output unit.

4. The storage system according to claim 1, wherein the performance managing unit sets a minimum value among a total value of performance limits of the disk devices in each RAID group in the storage, a performance limit of the controller of the storage in each RAID group, and a performance limit of the bandwidth from the computer to the storage in each RAID group as a performance limit of the storage.

5. The storage system according to claim 4, wherein the performance managing unit calculates an IO pattern for each RAID group, the IO pattern including an average of read/write rate and an average of read hit rate, and refers to a performance limit table storing the performance limits of the disk devices, the controller, and the host path corresponding to combinations of configurations of the IO patterns and the RAIDs to acquire the performance limits of the disk devices, the controller, and the host path from configurations of the calculated IO patterns and RAID groups to be processed.

6. The storage system according to claim 1, wherein the performance managing unit reads out a prepared extension plan of the disk devices in the storage, calculates an extension time in the case where the configuration of the extension plan is implemented, the extension time including the time required for moving data to the extended disk devices, and outputs the comparison information as well as the extension plan and the extension time to the output unit.

7. The storage system according to claim 1, wherein the performance managing unit calculates a time zone, in which a job is executed, from execution schedule information of the job in the computer or calculates the performance trend from an amount of IO of another time zone to calculate the approximate function.

8. The storage system according to claim 6, wherein the performance managing unit takes the sum of a plurality of job execution periods to specify the time zone in which the job is executed.

9. The storage system according to claim 1, wherein the performance managing unit narrows down the targets to RAID groups including storage areas having an amount of IO exceeding the value of the performance trend plus the standard error and calculates the performance trend of the targets.

10. A program for controlling a performance managed computer that manages processing performance of a storage in a storage system, the program causing the performance managed computer to realize:

a function of obtaining an approximate function of an amount of IO based on the transition of the amount of IO from a computer to the storage within a predetermined period to set the approximate function as a performance trend of the storage; a function of calculating a standard error of the amount of IO; a function of calculating an optimistic performance trend and a pessimistic performance trend from the approximate function as the performance trend and the standard error; a function of obtaining a performance limit of the storage; and a function of outputting comparison information between each of the performance trend, the optimistic performance trend, and the pessimistic performance trend and the performance limit to an output unit.

11. A method for managing processing performance of a storage in a storage system including a performance managing apparatus, the method comprising the steps of:

obtaining an approximate function of an amount of IO based on the transition of the amount of IO to and from the storage within a predetermined period to set the approximate function as a performance trend of the storage;

calculating a standard error of the amount of IO;

calculating an optimistic performance trend and a pessimistic performance trend from the approximate function as the performance trend and the standard error;

obtaining a performance limit of the storage; and outputting comparison information between each of the performance trend, the optimistic performance trend, and the pessimistic performance trend and the performance limit to an output device in the storage system;

wherein the comparison information is used to predict the performance limit excess time.

12. The method of claim 11, wherein the step of obtaining the performance limit of the storage includes setting a minimum value among a total value of performance limits of disk devices in the storage, a performance limit of controller of the storage, and a performance limit of a bandwidth between the storage and a computer apparatus connected to the storage as a performance limit of the storage.

* * * * *